H. COONEY & O. E. WILTSIE.
TIRE.
APPLICATION FILED JAN. 8, 1913.

1,085,545.

Patented Jan. 27, 1914.

Witnesses
W. H. Mulligan.
V. B. Hillyard.

Inventors
Hugh Cooney
Orris E. Wiltsie

By Victor J. Evans
Attorney

COLUMBIA PLANOGRAPH CO., WASHINGTON, D. C.

UNITED STATES PATENT OFFICE.

HUGH COONEY AND ORRIS E. WILTSIE, OF MARION, INDIANA.

TIRE.

1,085,545.  Specification of Letters Patent.  Patented Jan. 27, 1914.

Application filed January 8, 1913. Serial No. 740,831.

*To all whom it may concern:*

Be it known that we, HUGH COONEY and ORRIS E. WILTSIE, citizens of the United States, residing at Marion, in the county of Grant and State of Indiana, have invented new and useful Improvements in Tires, of which the following is a specification.

The invention provides a soft tread tire for vehicle wheels of every description including bicycles, motor-cycles and automobiles, said tire being constructed to utilize pneumatic pressure and the resiliency of yieldable material such as rubber.

The invention provides a tire having a plurality of cups in its outer or tread side, said tire being reinforced by layers or strips of canvas or like material, said strips being cemented together by rubber or secured in any manner to insure the provision of a substantial and durable article.

The invention consists of the novel features, details of construction and combination of parts, which hereinafter will be more particularly set forth, illustrated in the accompanying drawing, and pointed out in the appended claim.

Figure 1:
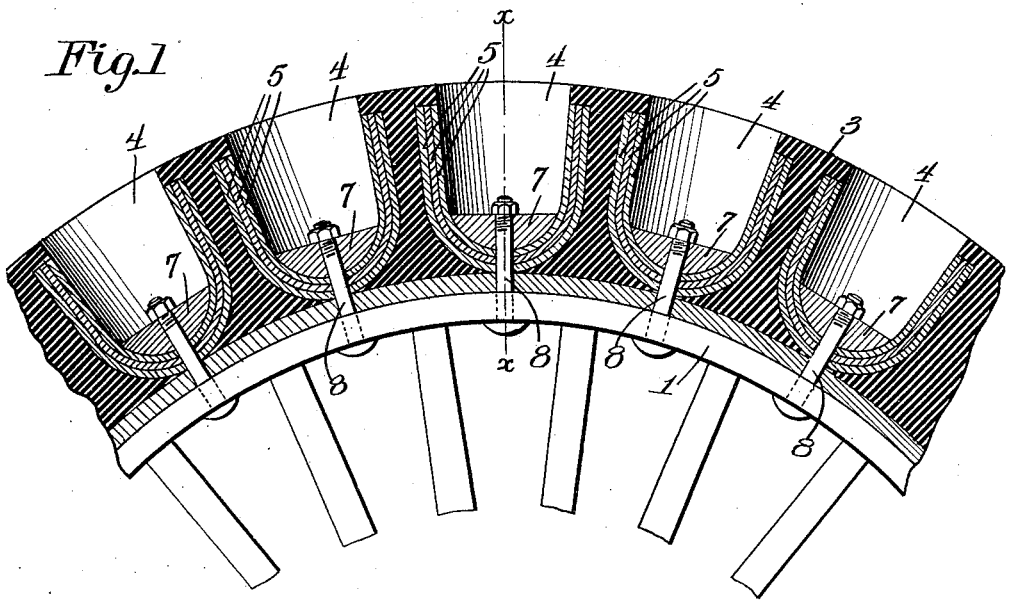
Figure 2:
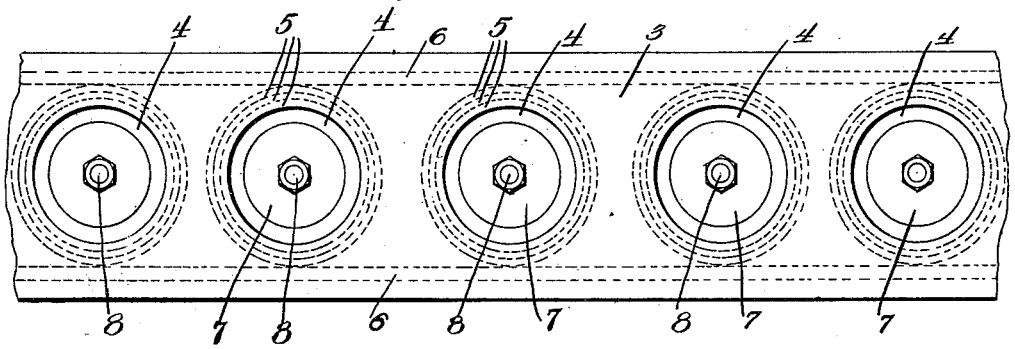
Figure 3:
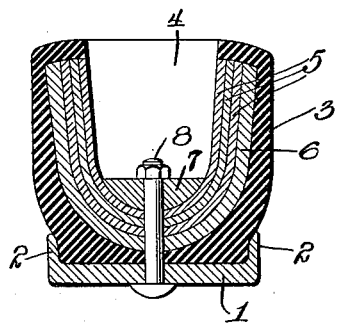

Referring to the drawing, forming a part of the specification, Figure 1 is a side view of a part of a tire embodying the invention, parts being broken away. Fig. 2 is a top plan view thereof. Fig. 3 is a section on the line x—x of Fig. 1.

Corresponding and like parts are referred to in the following description, and indicated in all the views of the drawing, by the same reference characters.

The numeral 1 designates a rim which forms a support for the tire proper and this rim may be a part of the vehicle wheel or may be separate therefrom and adapted to be secured in place thereon. The rim 1 is provided with side flanges 2 for retaining the tire in place thereon.

The tire is indicated at 3 and may be constructed wholly or in part of rubber, but it is preferred to have the same embody reinforcing strips of canvas or like material. The tire may be of any cross sectional outline and its tread side is broad so as to obtain an extended bearing upon the surface. A plurality of depressions 4 are formed in the outer or tread side of the tire and constitute chambers or cups for receiving air to supplement the action of the tire in supporting the load and also to maintain a partial vacuum under certain conditions to prevent skidding. The tire is reinforced around the depressions, chambers or cups 4, said reinforcement consisting of canvas or like material encircling said depressions and having the layers cemented. These reinforcements are indicated at 5. The edges of the tire are also reinforced by circumferential strips 6 which are molded or otherwise laid into the material forming the tire so as to strengthen the same against circumferential expansion. The inner ends of the depressions 4 are made rounding and receive washers 7 of plano-convex form, bolts or fastenings 8 being employed to secure the washers and the tire to the rim 1, said bolts passing through openings formed in the washers, tire and rim.

From the foregoing description, taken in connection with the accompanying drawing, the advantages of the construction and of the method of operation will be readily apparent to those skilled in the art to which the invention appertains, and while we have described the principle of operation of the invention, together with the device which we now consider to be the best embodiment thereof, we desire to have it understood that the device shown is merely illustrative, and that such changes may be made when desired as are within the scope of the claim appended hereto.

Having thus described the invention what is claimed as new, is:—

A continuous tire of yieldable material having a plurality of depressions of cup form in its tread side, a reinforcement for each of the depressions consisting of a textile strip wound upon itself with the layers cemented together and set in the body of the tire and forming a part thereof, and other strips molded in the edge portion of the tire upon opposite sides of the depressions therein.

In testimony whereof we affix our signatures in presence of two witnesses.

HUGH COONEY.
ORRIS E. WILTSIE.

Witnesses:
SAMUEL L. STRICLER,
W. A. FOWLER.

---

Copies of this patent may be obtained for five cents each, by addressing the "Commissioner of Patents, Washington, D. C."